_United States Patent Office_

3,376,291
Patented Apr. 2, 1968

3,376,291
17α-DIHALOPREGNENO[3,2-c]PYRAZOLES AND PROCESS FOR THEIR PREPARATION
John H. Fried, Palo Alto, Calif., assignor to Syntex Corporation, Panama, Panama, a corporation of Panama
No Drawing. Filed Feb. 10, 1966, Ser. No. 526,403
18 Claims. (Cl. 260—239.5)

ABSTRACT OF THE DISCLOSURE

As novel compounds, 17α-dihalomethylpregneno[3,2-c]-pyrazole steroids containing optional substitution and/or unsaturation at one or more positions on both the pyrazole moiety and the steroid nucleus which compounds are anti-inflammatory and corticoid agents and processes for the preparation of such compounds.

This invention is directed at novel cyclopentanopolyhydrophenanthrene derivatives and at processes for their preparation.

In particular, this invention is directed at 17α-dihalomethylpregneno[3,2-c]pyrazoles. Specifically, the present invention is directed at compounds of the formula:

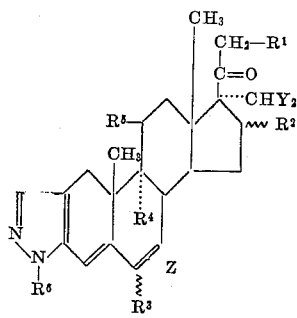

wherein $R^1$ is hydroxy, a hydrocarbon carboxylic acyloxy group of less than 12 carbon atoms, fluoro, phosphato or tetrahydropyranyloxy;
$R^2$ is hydrogen or methyl;
$R^3$ is hydrogen, chloro, fluoro or methyl;
$R^4$ is hydrogen or fluoro;
$R^5$ is β-hydroxy or keto;
$R^6$ is hydrogen, phenyl, chlorophenyl, fluorophenyl, methoxyphenyl or methylphenyl;
Y is chloro or fluoro; and
Z is a carbon-carbon double bond, a carbon-carbon single bond or the difluoromethylene group $$CF_2$$

The hydrocarbon carboxylic acyl and acyloxy groups in the compounds of the present invention will contain less than 12 carbon atoms and may be of a straight, branched, cyclic or cyclic-aliphatic chain structure. This structure may be saturated, unsaturated or aromatic, and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The foregoing compounds are anti-inflammatory and corticoid agents and are accordingly useful in the treatment of various inflammatory conditions such as allergies, contact dermatitis, arthritis, and the like. They may be administered in the usual pharmaceutical compositions at dosages appropriate for the condition being treated.

The preparation of these compounds may be represented by the following reaction scheme:

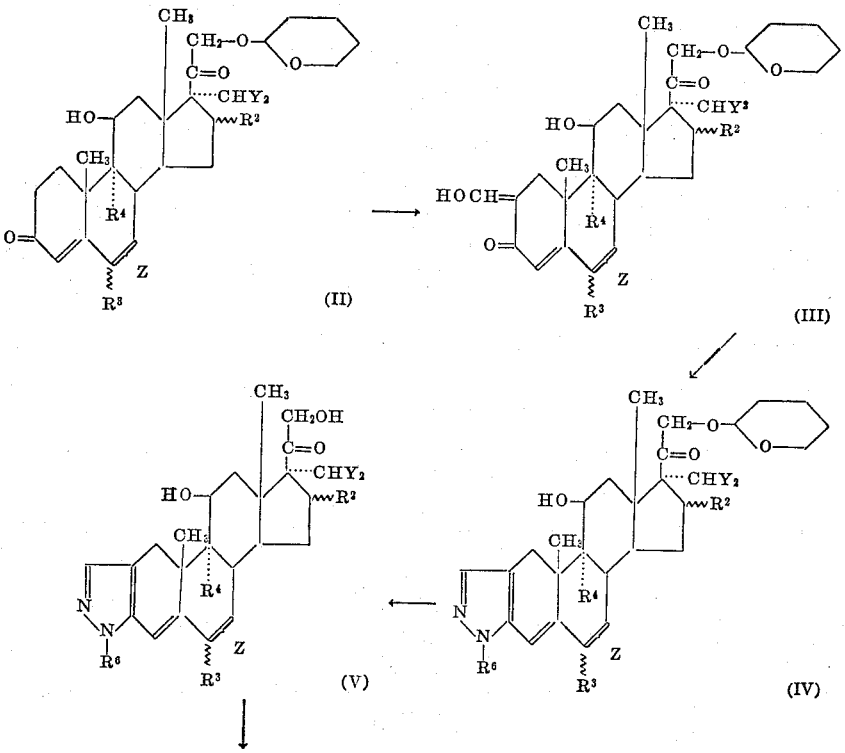

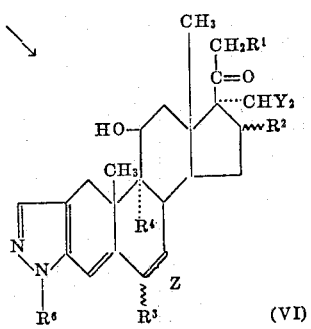

(VI)

In the foregoing, $R^1$, $R^2$, $R^3$, $R^4$, $R^6$, Z and Y are as previously defined.

Referring now to the above reaction scheme, a 21-tetrahydropyranyl ether of 17α-dihalomethylpregn-4-ene or -pregna-4,6-diene of Formula II is first treated with ethyl formate and sodium hydride in an inert atmosphere to yield the 2-hydroxymethylene derivative of Formula III. While under the conditions of this transformation, some formation of formate ester may occur at the unprotected 11-hydroxy group, and this product may be utilized in the next step and thereafter converted back to the free hydroxy compound through a brief alkaline hydrolysis.

The 2-hydroxymethylene derivative of Formula III is next treated with a hydrazine of the formula $NH_2NHR^6$, in which $R^6$ is as above defined, to yield the pregneno[3,2-c]pyrazoles of Formula IV. When $R^6$ is other than hydrogen, a mixture of varying amounts of 2'-substituted pregneno[3,2-c]pyrazoles, represented by Formula IV above, and 1'-substituted pregneno[3,2-c]pyrazoles is often obtained, the components being separated by conventional techniques such as chromatography, fractional crystallization, or similar methods. The reaction is executed under an inert atmosphere such as nitrogen or argon at elevated temperatures in an inert organic solvent, e.g. in refluxing ethanol.

The resulting pregneno[3,2-c]pyrazole of Formula IV may then be treated with acid to effect hydrolysis of the 21-tetahydropyranyl ether, thereby yielding the free 21-hydroxy compound of Formula V. This in turn may be converted to other compounds of the present invention. Thus, through treatment with an acylating agent such as an acid anhydride, e.g. acetic anhydride, propionic anhydride or the like as more fully set out before, in pyridine. Alternatively, the 21-hydroxy compounds may be converted to the corresponding 21-iodo intermediate through conventional procedures, such as formation of the 21-mesylate and treatment of this ester with sodium iodide. Treatment of this 21-iodo compound with lithium fluoride yields the 21-fluoro derivative, whereas treatment with silver phosphate and phosphoric acid furnishes the 21-dihydrogenphosphato derivative which may be titrated with base to yield the mono and dialkali metal salts thereof.

The requisite starting materials of Formula II may be obtained via a synthetic route which utilizes in part the following reaction scheme:

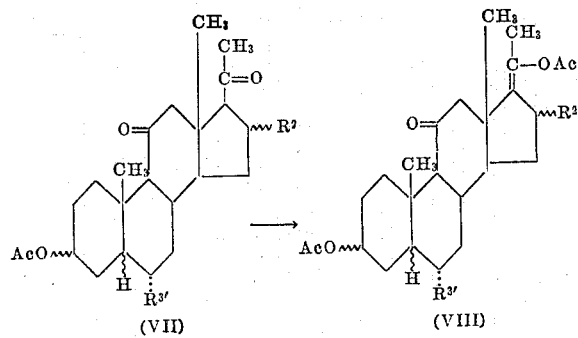

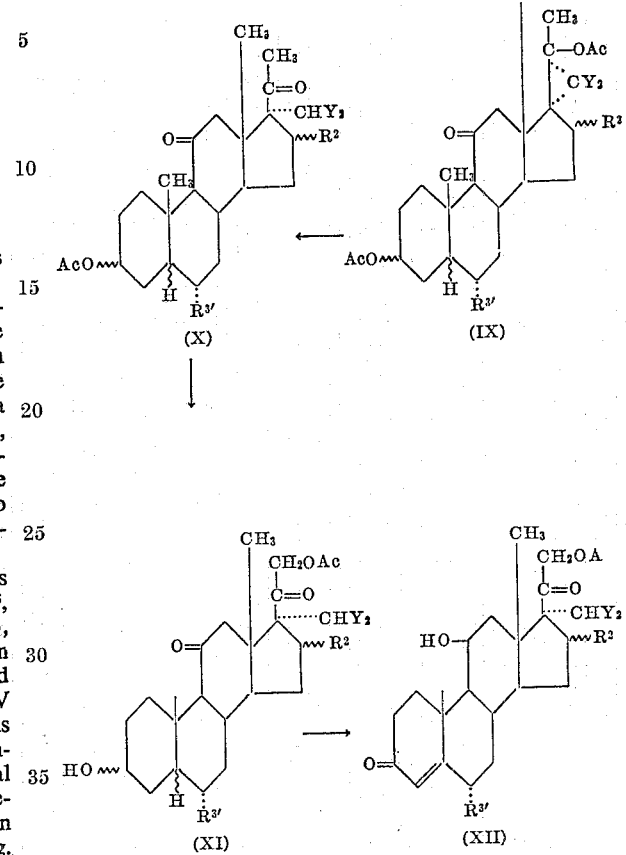

In the foregoing transformation, in which $R^{3'}$ is hydrogen or methyl, a 3-acyloxy-11,20-diketopregnane (VII) which may be optionally substituted with a methyl group in the 16α or 16β-position is treated with acetic anhydride in the presence of an acid catalyst such as p-toluenesulfonic acid. The resultant 20-acetoxypregn-17(20)-ene of Formula VIII is then subjected to the action of a reagent capable of generating a dihalomethylene radical such as, for example, sodium chlorodifluoroacetate or sodium trichloroacetate in refluxing diethyleneglycol dimethyl ether or triethyleneglycol dimethyl ether; a combination of trimethyl(trifluoromethyl)tin, phenyl(trichloromethyl)mercury or phenyl(bromodichloromethyl)-mercury and sodium iodide; and the like. There is thus obtained the corresponding 3-acyloxy-11-keto-17α,20-dihalomethylene-20-acetoxypregnane of Formula IX which upon treatment with an acidic agent such as boron trifluoride and hydrogen chloride in glacial acetic acid or perchloric acid in methanol undergoes hydrolytic ring opening to generate a 3-acyloxy-11-keto-17α-dihalomethyl-20-ketopregnane of Formula X. Hydrolysis of this product, as with potassium bicarbonate in methanol, then yields the corresponding 3-hydroxy derivative. Elaboration at C-21 next follows through α-bromination as with bromine in dioxane. Subsequent treatment of the resulting 21-bromo compound with potassium acetate then yields the 21-acetoxy derivative (XI). The 3-hydroxy group is then oxidized, as with chromic oxide in pyridine, to yield a 3,11,20 - triketo-17α-dihalomethyl-21-acetoxypregnane. Introduction of a $\Delta^4$ double bond is accomplished in the conventional manner through α-bromination and subsequent dehydrobromination, as with lithium chloride or calcium carbonate to yield the 3,11,20-triketo-17α-dihalomethyl-21-acetoxypregn-4-ene. In the case of 5α-pregnanes, the foregoing bromination and dehydrobromination is effected with initial treatment with bromine and sodium iodide followed by treatment with collidine. Conversion of the 11-keto group to an 11β-hydroxy substituent is effected by initial formation of the 3,20-bis semicarbazone, reduction of the 11-keto group as with sodium borohydride, and regeneration of the 3,20-diketo system with pyruvic acid (XII).

Compounds of Formula VII wherein R³' is methyl are obtained from a 3-hydroxypregn-5-ene-11,20-dione via conventional procedures. Thus, after protection of the 20-keto group through formation of an ethylene ketal, the Δ⁵ double bond is epoxidized as with monoperphthalic acid in chloroform. The resulting 5α,6α-oxido derivative is then treated with methylmagnesium bromide to yield the corresponding 3,5α-dihydroxy-6β-methyl compound which is oxidized with chromic trioxide in pyridine and then subjected to the action of base such as sodium hydroxide to furnish the corresponding 6α-methyl-20,20-ethylenedioxypregn-4-ene-3,11-dione. This compound is then catalytically reduced as with hydrogen and palladium to yield the corresponding 5β-pregnane. Treatment with sodium borohydride for about 30 minutes then yields the 3α-hydroxy-6α-methyl-20,20-ethylenedioxypregnan-11-one which is treated with acid to regenerate the 20-keto group and is converted to the 3α-acetoxy starting material with acetic anhydride in pyridine.

Introduction of a 9α-fluoro substituent is performed in the conventional fashion. Thus, an 11β-hydroxy compound of Formula XII is dehydrated to yield the Δ⁹⁽¹¹⁾-ene. This is converted to the 9β,11β-oxido compound through the bromohydrin intermediate. Treatment of the oxide with hydrogen fluoride then yields the 9α-fluoro-11β-hydroxy derivative.

Introduction of a 6α-chloro or 6α-fluoro substituent in a 3-keto-Δ⁴-ene such as that of Formula XII wherein R³' is hydrogen is accomplished through initial formation of the enol ether, as by the action of ethyl orthoformate and p-toluenesulfonic acid, followed by treatment with N-chlorosuccinimide or perchloryl fluoride respectively, with acid isomerization of any 6β-halo component formed.

The 3-keto-Δ⁴,⁶-dienes of the present invention are obtained from the corresponding 3-keto-Δ⁴-ene, such as those of Formula XII, via the action of chloranil or from its enol ether through the action of 2,3-dichloro-5,6-dicyanobenzoquinone. These may in turn be treated with sodium chlorodifluoroacetate (or with other difluoromethylene-forming reagents in the manner described above) to yield the 3-keto-6,7-difluoromethylene-Δ⁴-ene derivatives. Preferably during this reaction, a 21-hydroxy group is protected as through formation of a 21-tetrahydropyranyloxy group, with regeneration of the hydroxy group, if desired, being effected by brief treatment with acid.

The 21-acyloxy derivatives, e.g. 21-acetates, obtained via the above routes are then hydrolyzed under conventional basic techniques, such as with methanolic potassium bicarbonate, to yield the corresponding 21-hydroxy compounds. Upon treatment of this with dihydropyran in the presence of an acid catalyst, such as p-toluenesulfonic acid, dinitrobenzenesulfonic acid, or the like, there are obtained the appropriate 21-tetrahydropyranyl ether starting materials of Formula II above.

The following examples will serve to further typify the nature of this invention, but being presented solely for the purpose of illustration, they should not be construed as a limitation thereof.

A. Approximately 2 ml. of solvent are removed by distillation over a 30-minute period from a mixture of 1.2 g.

Example 1 of 3α-acetoxypregnane-11,20-dione, 20 ml. of acetic anhydride and .06 g. of p-toluenesulfonic acid. The mixture is then refluxed for 24 hours, cooled and diluted with ethyl acetate. The organic solution is then washed with water, aqueous sodium bicarbonate and again with water until neutral, dried over sodium sulfate and evaporated to dryness to yield 3α,20-diacetoxy-pregn-17-en-11-one which may be recrystallized from methylene chloride:hexane.

To a stirred and refluxing solution of 1 g. of 3α,20-diacetoxypregn-17-en-11-one in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, the mixture is filtered and evaporated in vacuo to dryness. The residue is chromatographed on alumina, eluting with methylene chloride, to yield 3α,20-diacetoxy-17α,20-difluoromethylenepregnan-11-one.

A solution of 1 g. of 3α,20-diacetoxy-17α,20-difluoromethylenepregnan-11-one in 30 ml. of absolute ethanol and 0.25 ml. of 70% perchloric acid is allowed to stand at 25° C. for 48 hours. At the end of this time, the reaction mixture is diluted with water and filtered. The solid thus collected is chromatographed on Florisil absorbent to yield 3α-acetoxy-17α-difluoromethylpregnane-11,20-dione.

One gram of 3α-acetoxy-17α-difluoromethylpregnane-11,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17α-difluoromethyl-3α-hydroxypregnane-11,20-dione which is collected by filtration and recrystallized from acetone:hexane.

A solution of 6 g. of 17α-difluoromethyl-3α-hydroxypregnane-11,20-dione in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 17α-difluoromethylpregnane-3,11,20-trione which may be further purified by recrystallization from acetone:hexane.

To a stirred solution of 1 g. of 17α-difluoromethylpregnane-3,11,20-trione in 17 ml. of chloroform and 20 ml. of glacial acetic acid, cooled to −10° C., are added a few drops of a 15% solution of hydrogen bromide in acetic acid followed by a solution of 0.46 g. of bromine in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution and again with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms, and this material is then collected by filtration, washed with cold 1:1 water:dimethylformamide and then water and dried to yield 17α-difluoromethylpregn-4-ene-3,11,20-trione which is further purified through recrystallization from acetone with charcoal decolorization as necessary.

To a suspension of 1 g. of 17α-difluoromethylpregn-4- ene-3,11,20-trione in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water and dried to yield 3,20-bis semicarbazone-17α-difluoromethylpregn-4-en-11-one which is recrystallized from pyridine:methanol.

A solution of 1 g. of sodium borohydride in 3 ml. of water is added to an ice-cooled solution of 1 g. of 3,20-bis semicarbazone - 17α - difluoromethylpregn-4-en-11-one in 120 ml. of methanol, and the mixture is then allowed to stand for 16 hours at room temperature. The excess reagent is decomposed by addition of acetic acid, and the solution is then concentrated to small volume in vacuo and diluted with water. The product is extracted with ethyl acetate, and these extracts are washed with water, dried and evaporated to yield 3,20-bis semicarbazone-17α-difluoromethylpregn-4-en-11β-ol which may be further purified by recrystallization from acetone:hexane.

A suspension of 1 g. of 3,20-bis semicarbazone-17α-difluoromethylpregn-4-en-11β-ol in 20 ml. of pyridine and 7.5 ml. of acetic anhydride is heated at steam bath temperatures for three hours. The mixture is then poured into 120 ml. of ice water and the pyridine is neutralized through the addition of hydrochloric acid. This mixture is extracted with methylene chloride, and these extracts are washed with water to neutrality, dried and evaporated to dryness. The residue thus obtained is chromatographed on Florisil absorbent to yield 11β-hydroxy-17α-difluoromethylpregn-4-ene-3,20-dione which may be further purified through recrystallization from acetone:hexane.

To a stirred, cooled solution of 4 g. of 11β-hydroxy-17α-difluoromethylpregn-4-ene-3,20-dione in 30 ml. of tetrahydrofuran and 18 ml. of methanol is first added in small portions 6 g. of pure calcium oxide and then 6 g. of iodine. Stirring at room temperature is continued until the solution becomes a pale yellow. The mixture is then poured into ice water containing 18 ml. of acetic acid and 2 g. of sodium thiosulfate. After stirring for 15 minutes, the solution is decanted and the solid collected by filtration to yield 11β-hydroxy-17α-difluoromethyl-21-iodopregn-4-ene-3,20-dione. This compound is mixed with 80 ml. of acetone and 12 g. of recently fused potassium acetate. This mixture is refluxed for eight hours and then concentrated to a small volume, diluted with water and extracted with ethyl acetate. The ethyl acetate extracts are washed with water, dried over sodium sulfate and concentrated until crystallization occurs. The solid is collected and recrystallized from methanol:water to yield 11β-hydroxy-17α-difluoromethyl - 21 - acetoxypregn - 4 - ene-3,20-dione.

Similarly, from 3α-acetoxy-16α-methylpregnane-11,20-dione and 3α-acetoxy-16β-methylpregnane - 11,20 - dione there are respectively obtained according to the foregoing procedure, 11β-hydroxy-16α-methyl-17α - difluoromethyl-21-acetoxypregn-4-ene-3,20-dione and 11β-hydroxy-16β-methyl-17α-difluoromethyl-21-acetoxypregn-4 - ene - 3,20-dione.

One gram of 11β-hydroxy-17α-difluoromethyl-21-acetoxy-pregn-4-ene-3,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 11β,21 - dihydroxy - 17α - difluoromethylpregn-4-ene-3,20-dione which is collected by filtration and recrystallized from acetone:hexane.

Utilization of this hydrolysis procedure with the other 21-acetoxy derivatvies described above yields 11β,21-dihydroxy-16α-methyl - 17α - difluoromethylpregn - 4 - ene-3,20-dione and 11β,21-dihydroxy-16β-methyl-17α-difluoromethylpregn-4-ene-3,20-dione.

(B) Two milliliters of dihydropyran are added to a solution of 1 g. of 11β,21-dihydroxy-17α-difluoromethylpregn-4-ene-3,20-dione in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated. The residue is chromatographed on neutral alumina, eluting with hexane, to yield 11β-hydroxy-17α-difluoromethyl-21-tetrahydropyranyloxypregn-4-ene-3,20-dione which is recrystallized from pentane.

To a stirred solution of 3 g. of 11β-hydroxy-17α-difluoromethyl-21-tetrahydropyranyloxypregn-4-ene - 3,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-11β-hydroxy-17α-difluoromethyl-21 - tetrahydropyranyloxypregn - 4 - ene-3,20-dione which is recrystallized from methylene chloride:hexane.

A suspension of 1 g. of 2-hydroxymethylene-11β-hydroxy-17α-difluoromethyl-21 - tetrahydropyranyloxypregn-4-ene-3,20-dione and 0.20 g. of sodium acetate in 25 ml. of ethanol is treated with 1.2 equivalents of sodium acetate and 1.2 equivalents of p-fluorophenylhydrazine hydrochloride. The mixture is refluxed under nitrogen for one hour, evaporated to dryness and dissolved in ether. This ethereal solution is washed with dilute aqueous hydrochloric acid, dilute aqueous sodium hydroxide and water, dried over magnesium sulfate and evaporated to dryness under reduced pressure. The residue is dissolved in 50 ml. of methanol and allowed to stand under nitrogen for 10 minutes with 10 ml. of 1.33 N sodium methoxide in methanol. After neutralization with acetic acid, the mixture is diluted with ethyl acetate and washed with water. The organic solution is then dried over sodium sulfate and evaporated to dryness to yield 11β-hydroxy-17α-difluoromethyl-20-keto-21 - tetrahydropyranyloxy-2' - (4 - fluorophenyl)-pregn-4-eno[3,2-c]pyrazole.

To a solution of 1 g. of 11β-hydroxy-17α-difluoromethyl-20-keto-21 - tetrahydropyranyloxy-2' - (4 - fluorophenyl)-pregn-4-eno-[3,2-c]pyrazole in 30 ml. of acetic acid is added 0.5 ml. of 2 N hydrochloric acid. The mixture is allowed to stand five hours at room temperature and is then diluted with ice water and extracted with methylene chloride. The extracts are washed with water to neutrality, dried over sodium sulfate and evaporated to dryness to yield 11β,21-dihydroxy-17α-difluoromethyl-20-keto-2'-(4-fluorophenyl)-pregn - 4 - eno[3,2-c]pyrazole which is recrystallized from acetone:hexane.

There are similarly prepared from the correspondingly substituted 3-keto-Δ⁴ compounds, 11β,21-dihydroxy-16α-methyl-17α-difluoromethyl-20-keto-2' - (4 - fluorophenyl)-pregn-4-eno[3,2-c]pyrazole and 11β,21 - dihydroxy - 16β-methyl-17α-difluoromethyl-20-keto - 2'(4 - fluorophenyl)-pregn-4-eno[3,2-c]pyrazole.

Likewise, by the use of other hydrazines such as o-, m- and p-methylphenylhydrazine, o-, m- and p-methoxyphenylhydrazine, o-, m-, and p-chlorophenyldrazine and phenylhydrazine in place of hydrazine in the foregoing procedure, there are obtained the corresponding pregn-4-eno[3,2-c]pyrazoles substituted in the 2'-position by o-methylphenyl, m-methylphenyl, p-methylphenyl, o-methoxyphenyl, m-methoxyphenyl, p-methoxyphenyl, o-chlorophenyl, m-chlorophenyl, p-chlorophenyl or phenyl group, respectively. Notable among these are 11β,21-dihydroxy-17α-difluoromethyl-20-keto-2' - phenylpregn - 4 - eno[3,2 - c] pyrazole, 11β,21-dihydroxy-16α - methyl - 17α - difluoromethyl-20-keto-2'-phenylpregn-4-eno[3,2-c]pyrazole and 11β,21-dihydroxy-16β-methyl - 17α - difluoromethyl - 20-keto-2'-phenylpregn-4-enol[3,2-c]pyrazole.

Example 2

To a stirred and refluxing solution of 1 g. of 3α,20-diacetoxypregn-17-en-11-one in 10 ml. of dimethyl triethyleneglycol ether is added in a dropwise fashion over a two-hour period and under nitrogen, 30 equivalents of a 50% w./v. solution of sodium trichloroacetate. The solution is then cooled and filtered and the filtrate is evaporated to dryness under reduced pressure. The residue thus obtained is chromatographed on alumina, eluting with methylene chloride, to yield 3α,20-diacetoxy-17α,20-dichloromethylenepregnan-11-one.

A solution of 1 g. of 3α,20-diacetoxy-17α,20-dichloromethylenepregnan-11-one in 30 ml. of absolute ethanol and 0.25 ml. of 70% perchloric acid is allowed to stand at 25° C., for 48 hours. At the end of this time, the mixture is diluted with water and filtered. Upon chromatography on Florisil absorbent there is obtained 3α-acetoxy-17α-dichloromethylpregnane-11,20-dione.

Upon substituting this compound for 3α-acetoxy-17α-difluoromethylpregnane-11,20-dione in the procedures described in Part A of Example 1, there is obtained 11β,21-dihydroxy-17α-dichloromethylpregn-4 - ene - 3,20 - dione. This compound is then processed according to the reaction sequence of Part B of Example 1 to yield 11β,21-dihydroxy-17α-dichloromethyl - 20 - keto-2' - (4-fluorophenyl)-pregn-4-eno[3,2-c]pyrazole. Alternatively, use of the analogous 16α and 16β-methyl starting materials yields the correspondingly substituted pregn-4-eno[3,2-c]pyrazoles.

Example 3

One gram of 11β-hydroxy-17α-difluoromethyl-21-acetoxypregn-4-ene-3,20-dione is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water and extracted with ethyl acetate. The extracts are washed with water, dried over sodium sulfate and evaporated to yield 17α-difluoromethyl-21-acetoxypregna-4,9(11)-diene - 3,20 - dione which may be further purified through recrystallization from acetone:hexane.

Twenty-eight grams of N-bromoacetamide are added over a one hour period with stirring, in the dark and at room temperature, to a mixture of 50 g. of 17α-difluoromethyl-21-acetoxypregna-4,9(11)-diene-3,20-dione, 500 ml. of pure dioxane and 8 ml. of 0.4 N perchloric acid. The reaction mixture is stirred for an additional hour and a solution of 10% sodium sulfite is then added until negative to potassium-starch indicator paper. Ice is added and the mixture is extracted with chloroform. These extracts are washed consecutively with water, 5% aqueous sodium bicarbonate solution and water, and the solvent is then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for 10 hours, cooled, and almost all of the acetone is removed by distillation. Iced water is then added and the solid which forms is collected by filtration, washed with water and dried to yield 9β,11β-oxido-17α-difluoromethyl-21-acetoxypregn-4-ene-3,20-dione which may be further purified through recrystallization from methylene chloride:benzene.

To a stirred solution of 1.8 g. of 9β,11β-oxido-17α-difluoromethyl-21-acetoxypregn-4-ene-3,20-dione in 30 ml. of methylene chloride, cooled to 0° C., is added a cooled solution (−70° C.) of 2.11 g. of anhydrous hydrogen fluoride in 3.7 ml. of tetrahydrofuran over a period of 20 minutes. The mixture is stirred at a temperature below 10° C. for six hours and then neutralized by the cautious addition of 5% aqueous sodium bicarbonate solution. The organic layer is separated, washed with water, dried over sodium sulfate and concentrated until solid forms. The cooled mixture is then filtered and the solid is dissolved in hot ethyl acetate. This solution is filtered hot and is then cooled, and the solid which forms is collected by filtration to yield 9α-fluoro-11β-hydroxy-17α-difluoromethyl-21-acetoxypregn-4-ene-3,20-dione.

One gram of 9α-fluoro-11β-hydroxy-17α-difluoromethyl-21-acetoxypregn-4-ene-3,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 9α-fluoro-11β,21-dihydroxy-17α-difluoromethylpregn-4-ene-3,20-dione which is collected by filtration and recrystallized from acetone:hexane.

Two milliliters of dihydropyran are added to a solution of 1 g. of 9α-fluoro-11β,21-dihydroxy-17α-difluoromethyl-pregn-4-ene-3,20-dione in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated. The residue is chromatographed on neutral alumina, eluting with hexane, to yield 9α-fluoro-11β-hydroxy-17α-difluoromethyl - 21 - tetrahydropyranyloxypregn - 4 - ene - 3,20 - dione which is recrystallized from pentane.

To a stirred solution of 3 g. of 9α-fluoro-11β-hydroxy-17α - difluoromethyl - 21 - tetrahydropyranyloxypregn - 4 - ene-3,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-9α-fluoro-11β - hydroxy - 17α - difluoromethyl - 21 - tetrahydropyranyloxypregn-4-ene-3,20-dione which is recrystallized from methylene chloride:hexane.

A solution of 0.66 g. of 2-hydroxymethylene-9α-fluoro-11β - hydroxy - 17α - difluoromethyl-21-tetrahydropyranyloxypregn-4-ene-3,20-dione in 7 ml. of absolute ethanol is treated with 1.2 ml. of hydrazine hydrate. The mixture is refluxed under nitrogen for 45 minutes and then evaporated to dryness under reduced pressure to yield 9α-fluoro-11β - hydroxy - 17α - difluoromethyl - 20 - keto - 21 - tetrahydropyranyloxypregn-4-eno[3,2-c]pyrazole which may be further purified through recrystallization from chloroform:hexane and converted to the free 21-hydroxy compound through acid hydrolysis in the same fashion as described in Example 1.

In a similar fashion, 9α-fluoro-11β,21-dihydroxy-16α-methyl - 17α - difluoromethyl - 20 - ketopregn - 4 - eno [3,2-c]pyrazole and 9α-fluoro-11β,21-dihydroxy-16β-methyl - 17α - difluoromethyl - 20 - ketopregn - 4 - eno [3,2-c]pyrazole are obtained via the procedure of this example.

By utilizing phenyl hydrazine and p-fluorophenyl hydrazine, in the same fashion as described in Example 1, there are obtained, according to the present example, the following compounds:

9α-fluoro-11β,21-dihydroxy-17α-difluoromethyl-20-keto-2'-phenylpregn-4-eno[3,2-c]pyrazole;
9α-fluoro-11β,21-dihydroxy-16α-methyl-17α-difluoromethyl-20-keto-2'-phenylpregn-4-eno[3,2-c]pyrazole;
9α-fluoro-11β,21-dihydroxy-16β-methyl-17α-difluoromethyl-20-keto-2'-phenylpregn-4-eno[3,2-c]pyrazole;
9α-fluoro-11β,21-dihydroxy-17α-difluoromethyl-20-keto-
   2'-(4-fluorophenyl)-pregn-4-eno[3,2-c]pyrazole;
9α-fluoro-11β,21-dihydroxy-16α-methyl-17α-difluoro-
   methyl-20-keto-2'-(4-fluorophenyl)-pregn-4-
   eno[3,2-c]pyrazole; and
9α-fluoro-11β,21-dihydroxy-16β-methyl-17α-difluoro-
   methyl-20-keto-2'-(4-fluorophenyl)-pregn-4-
   eno[3,2-c]pyrazole.

Example 4

To a suspension of 1 g. of 11β-hydroxy-17α-difluoromethyl-21-acetoxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-11β-hydroxy-17α-difluoromethyl-21-acetoxypregna-3,5-diene-20-one which is recrystallized from acetone:hexane.

A mixture of 5 g. of 3-ethoxy-11β-hydroxy-17α-difluoromethyl-21-acetoxypregna-3,5-dien-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-11β-hydroxy-17α-difluoromethyl-21-acetoxypregn-4-ene-3,20-dione which is recrystallized from acetone. The corresponding 6α-chloro compound is obtained by dissolving this compound in glacial acetic acid and introducing a slow stream of anhydrous hydrogen chloride over a period of four hours at a temperature of 15° C. The solid which forms upon pouring this mixture into water is collected by filtration, washed with water and dried to yield 6α-chloro-11β-hydroxy-17α-difluoromethyl-21-acetoxypregn-4-ene-3,20-dione which is recrystallized from acetone:hexane.

6α-chloro-11β-hydroxy-16α-methyl-17α-difluoromethyl-21-acetoxypregn-4-ene-3,20-dione; 6α-chloro-11β-hydroxy-16β-methyl-17α-difluoromethyl-21-acetoxypregn-4-ene-3,20-dione; 6α-chloro-9α-fluoro-11β-hydroxy-17α-difluoromethyl-21-acetoxypregn-4-ene-3,20-dione; 6α-chloro-9α-fluoro-11β-hydroxy-16α-methyl-17α-difluoromethyl-21-acetoxypregn-4-ene-3,20-dione; and 6α-chloro-9α-fluoro-11β-hydroxy-16β-methyl-17α-difluoromethyl-21-acetoxypregn-4-ene-3,20-dione are obtained from the appropriate starting material in a fashion analogous to that described in this example.

By subjecting 6α-chloro-11β-hydroxy-17α-difluoromethyl-21-acetoxypregn-4-ene-3,20-dione to the alkaline hydrolysis procedure described in Part A of Example 1, there is obtained 6α-chloro-11β,21-dihydroxy-17α-difluoromethylpregn-4-ene-3,20-dione. The following compounds are similarly obtained from their 21-acetates:

6-chloro-11β,21-diacetoxy-16α-methyl-17α-difluoro-
   methylpregn-4-ene-3,20-dione;
6α-chloro-11β,21-diacetoxy-16β-methyl-difluoromethyl-
   pregn-4-one-3,20-dione;
6α-chloro-9α-fluoro-11β,21-dihydroxy-17α-difluoro-
   methylpregn-4-ene-3,20-dione;
6α-chloro-9α-fluoro-11β,21-dihydroxy-16α-methyl-17α-
   difluoromethylpregn-4-ene-3,20-dione; and
6α-chloro-9α-fluoro-11β,21-dihydroxy-16β-methyl-17α-
   difluoromethylpregn-4-ene-3,20-dione.

Upon subjecting these free 21-hydroxy compounds to the procedure of Part B of Example 1, there are respectively obtained the corresponding pregn-4-eno[3,2-c]pyrazoles, namely:

6α-chloro-11β,21-dihydroxy-17α-difluoromethyl-20-keto-
   2'-(4-fluorophenyl)-pregn-4-eno[3,2-c]pyrazole;
6α-chloro-11β,21-dihydroxy-16α-methyl-17α-difluoro-
   methyl-20-keto-2'-(4-fluorophenyl)-pregn-4-eno-
   [3,2-c]pyrazole;
6α-chloro-11β,21-dihydroxy-16β-methyl-17α-difluoro-
   methyl-20-keto-2'-(4-fluorophenyl)-pregn-4-eno-
   [3,2-c]pyrazole;
6α-chloro-9α-fluoro-11β,21-dihydroxy-17α-difluoro-
   methyl-20-keto-2'(4-fluorophenyl)-pregn-4-eno-
   [3,2-c]pyrazole;
6α-chloro-9α-fluoro-11β,21-dihydroxy-16α-methyl-17α-
   difluoromethyl-20-keto-2'(4-fluorophenyl)-pregn-4-
   eno[3,2-c]-pyrazole; and
6α-chloro-9α-fluoro-11β,21-dihydroxy-16β-methyl-17α-
   difluoromethyl-20-keto-2'-(4-fluorophenyl)-pregn-4-
   eno[3,2-c]pyrazole.

Example 5

A stream of perchloryl fluoride is passed through a solution of 1 g. of 3-ethoxy-11β-hydroxy-17α-difluoromethyl-21-acetoxypregna-3,5-dien-20-one in 25 ml. of dimethylformamide, cooled to 0° C., for five minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid, and through this solution is passed a stream of dry hydrogen chloride for a period of 24 hours at a temperature of 15° C. The mixture is poured into cold water and the solid which forms is collected by filtration, washed with water and dried to yield 6α-fluoro-11β-hydroxy-17α-difluoromethyl-21-acetoxypregn-4-ene-3,20-dione which is recrystallized from acetone:hexane.

Likewise, the various other enol ethers prepared in the course of synthesizing the 6α-chloro derivatives described in Example 4 are subjected to the procedure of this example to yield the corresponding 6α-fluoro derivatives as their 21-acetates. Upon hydrolyzing 6α-fluoro-11β-hydroxy-17α-difluoromethyl-21-acetoxypregn-4-ene-3,20-dione and these 6α-fluoro-21-acetates with potassium bicarbonate as previously described, there are respectively obtained:

6α-fluoro-11β,21-dihydroxy-17α-difluoromethylpregn-4-
   ene-3,20-dione;
6α-fluoro-11β,21-dihydroxy-16α-methyl-17α-difluoro-
   methylpregn-4-ene-3,20-dione;
6α-fluoro-11β,21-dihydroxy-16β-methyl-17α-difluoro-
   methylpregn-4-ene-3,20-dione;
6α,9α-difluoro-11β,21-dihydroxy-17α-difluoromethyl-
   pregn-4-ene-3,20-dione;
6α,9α-difluoro-11β,21-dihydroxy-16α-methyl-17α-difluo-
   romethylpregn-4-ene-3,20-dione; and
6α,9α-difluoro-11β,21-dihydroxy-16β-methyl-17α-difluo-
   romethylpregn-4-ene-3,20-dione.

Upon subjecting these compounds to the procedure of Part B of Example 1, there are respectively obtained:

6α-fluoro-11β,21-dihydroxy-17α-difluoromethyl-20-keto-
   2'-(4-fluorophenyl)-pregn-4-eno[3,2-c]pyrazole;
6α-fluoro-11β,21-dihydroxy-16α-methyl-17α-difluoro-
   methyl-20-keto-2'-(4-fluorophenyl)-pregn-4-eno-
   [3,2-c]pyrazole;
6α-fluoro-11β,21-dihydroxy-16β-methyl-17α-difluoro-
   methyl-20-keto-2'-(4-fluorophenyl)-pregn-4-eno-
   [3,2-c]pyrazole;
6α,9α-difluoro-11β,21-dihydroxy-17α-difluoromethyl-20-
   keto-2'-(4-fluorophenyl)-pregn-4-eno[3,2-c]pyrazole;

6α,9α-difluoro-11β,21-dihydroxy-16α-methyl-17α-difluoromethyl-20-keto-2'-(4-fluorophenyl)-pregn-4-eno-[3,2-c]pyrazole; and
6α,9α-difluoro-11β,21-dihydroxy-16β-methyl-17α-difluoromethyl-20-keto-2'-(4-fluorophenyl)-pregn-4-eno-[3,2-c]pyrazole.

By utilizing phenylhydrazine in place of p-fluorophenylhydrazine the corresponding 2'-phenylpregn-4-eno [3,2-c]pyrazoles are obtained.

Example 6

A mixture of 1 g. of 3β-acetoxypregn-5-ene-11,20-dione, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield 3β-acetoxy-20,20-ethylenedioxypregn-5-en-11-one which is recrystallized from acetone:hexane.

A solution of 2.5 g. of 3β-acetoxy-20,20-ethylenedioxypregn-5-en-11-one in 100 ml. of chloroform is cooled to 0° C., and mixed with a solution of 1.1 molar equivalents of monoperphthalic acid in ether. The mixture is allowed to stand at room temperature for 20 hours and is then diluted with water. The organic layer is separated, washed with aqueous sodium bicarbonate solution and then with water to neutrality, dried over sodium sulfate and evaporated to dryness to yield 3β-acetoxy-5α,6α-oxido-20,20-ethylenedioxypregnan-11-one which may be further purified by recrystallization from acetone:hexane.

To a stirred solution of 20 ml. of 4 N methylmagnesium bromide in ether is added a solution of 1 g. of 3β-acetoxy-5α,6α-oxido-20,20-ethylenedioxypregnan-11-one in 30 ml. of dry tetrahydrofuran, and the stirred mixture is heated at reflux temperatures for 30 minutes. The reflux condenser is then replaced by a calcium chloride drying tube and the ether is allowed to escape. When the internal temperature is 54° C., the condenser is returned and the mixture is refluxed for an additional four-hour period. Two hundred milliliters of a saturated ammonium chloride solution are then slowly added to the cooled mixture, which is then stirred for 15 minutes and extracted with ethyl acetate. These extracts are washed with water, dried over sodium sulfate and evaporated to dryness to yield 3β,5α-dihydroxy-6β-methyl-20,20-ethylenedioxypregnan-11-one which is recrystallized from aqueous methanol.

A solution of 6 g. of 3β,5α-dihydroxy-6β-methyl-20,20-ethylenedioxypregnan-11-one in 120 ml. of pyridine is added to a mixture of 6 g. of chromic trioxide in 20 ml. of pyridine. The reaction mixture is allowed to stand at room temperature for 15 hours, is diluted with ethyl acetate and filtered through Celite diatomaceous earth. The filtrate is washed well with water, dried and evaporated to dryness to yield 5α-hydroxy-6β-methyl-20,20-ethylenedioxypregnane-3,11-dione which may be further purified by recrystallization from acetone:hexane.

A solution of 1 g. of 5α-hydroxy-6β-methyl-20,20-ethylenedioxypregnane-3,11-dione in 100 ml. of methanol and 50 ml. of 1 N aqueous sodium hydroxide is allowed to stand at room temperature under nitrogen for 24 hours. The solution is then concentrated under reduced pressure and without heating to half its volume and is diluted with ice water. The solid which forms is collected by filtration, washed with water and dried to yield 6α-methyl-20,20-ethylenedioxypregn-4-ene-3,11-dione which may be further purified through recrystallization from acetone:hexane.

A suspension of 0.5 g. of 5% palladium-on-carbon catalyst in 50 ml. of methanol is hydrogenated for 30 minutes. A solution of 2 g. of 6α-methyl-20,20-ethylenedioxypregn-4-ene-3,11-dione in 200 ml. of methanol is added and hydrogenated with agitation until the uptake of hydrogen has ceased. The catalyst is removed by filtration and the solution is evaporated to yield 6α-methyl-20,20-ethylenedioxy-5β-pregnane-3,11-dione which is recrystallized from methylene chloride:hexane for further purification.

A solution of 1 g. of sodium borohydride in 3 ml. of water is added to an ice-cooled solution of 1 g. of 6α-methyl-20,20-ethylenedioxy-5β-pregnane-3,11-dione in 120 ml. of methanol and the mixture is then allowed to stand for 30 minutes at room temperature. The excess reagent is decomposed by addition of acetic acid and the solution is then concentrated to small volume in vacuo and diluted with water. The product is extracted with ethyl acetate and these extracts are washed with water, dried and evaporated to yield 3α-hydroxy-6α-methyl-20,20-ethylenedioxy-5β-pregnan-11-one which may be further purified by recrystallization from acetone:hexane.

A mixture of 0.5 g. of 3α-hydroxy-6α-methyl-20,20-ethylenedioxy-5β-pregnan-11-one in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 3α-hydroxy-6α-methylpregnane-11,20-dione which is recrystallized from acetone:hexane.

A mixture of 1 g. of 3α-hydroxy-6α-methylpregnane-11,20-dione, 4 ml. of pyridine and 2 ml. of acetic anhydride is allowed to stand at room temperature for 15 hours. The mixture is then poured into ice water and the solid which forms is collected by filtration, washed with water and dried to yield 3α-acetoxy-6α-methylpregnane-11,20-dione which may be further purified through recrystallization from acetone:hexane.

By substituting 3α-acetoxy-6α-methylpregnane-11,20-dione for 3α-acetoxypregnane-11,20-dione in the procedure of Example 1, there is obtained upon completion of the steps therein described, 6-α-methyl-11β,21-dihydroxy-17α-difluoromethyl-20-keto-2'-(4-fluorophenyl)-pregn-4-eno[3,2-c]pyrazole. The corresponding 9α-fluoro compound is prepared via the procedure of Example 3.

Example 7

To a suspension of 1 g. of 6α-chloro-11β-hydroxy-17α-difluoromethyl-21-acetoxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and is allowed to stand at room temperature for 30 minutes. There is then added 0.8 ml. of pyridine, followed by water until solidification occurs. This solid is collected by filtration, washed with water and air dried to yield 3-ethoxy-6-chloro-11β-hydroxy-17α-difluoromethyl-21-acetoxypregna-3,5-dien-20-one which is recrystallized from acetone:hexane.

To a solution of 1 g. of 3-ethoxy-6-chloro-11β-hydroxy-17α-difluoromethyl-21-acetoxypregna-3,5-dien-20-one in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-chloro-11β-hydroxy-17α-difluoromethyl-21-acetoxypregna-4,6-diene-3,20-dione which may be further purified through recrystallization from acetone:hexane.

The foregoing 21-acetoxy derivative is converted to the corresponding free 21-hydroxy compound through hydrolysis with potassium bicarbonate in the manner previously described and then subjected to the procedure of Example 1, Part B, to yield 6-chloro-11β,21-dihydroxy- 17α-difluoromethyl-20-keto-2'-(4-fluorophenyl)-pregna-4,6-dieno[3,2-c]pyrazole.

In a similar manner, the following compounds are produced:

11β,21-dihydroxy-17α-difluoromethyl-20-keto-2'-(4-fluorophenyl)-pregna-4,6-dieno[3,2-c]pyrazole;
11β,21-dihydroxy-16α-methyl-17α-difluoromethyl-20-keto-2'-(4-fluorophenyl)-pregna-4,6-dieno[3,2-c]pyrazole;
11β,21-dihydroxy-16β-methyl-17α-difluoromethyl-20-keto-2'-(4-fluorophenyl)-pregna-4,6-dieno[3,2-c]pyrazole;
6-chloro-11β,21-dihydroxy-16α-methyl-17α-difluoromethyl-20-keto-2'-(4-fluorophenyl)-pregna-4,6-dieno-[3,2-c]pyrazole;
6-chloro-11β,21-dihydroxy-16β-methyl-17α-difluoromethyl-20-keto-2'-(4-fluorophenyl)-pregna-4,6-dieno-[3,2-c]pyrazole;
6-fluoro-11β,21-dihydroxy-17α-difluoromethyl-20-keto-2'-(4-fluorophenyl)-pregna-4,6-dienol[3,2-c]pyrazole;
6-fluoro-11β,21-dihydroxy-16α-methyl-17α-difluoromethyl-20-keto-2'-(4-fluorophenyl)-pregna-4,6-dieno[3,2-c]pyrazole;
6-fluoro-11β,21-dihydroxy-16β-methyl-17α-difluoromethyl-20-keto-2'-(4-fluorophenyl)-pregna-4,6-dieno-[3,2-c]pyrazole;
6-methyl-11β,21-dihydroxy-17α-difluoromethyl-20-keto-2'-(4-fluorophenyl)-pregna-4,6-dieno[3,2-c]pyrazole;
9α-fluoro-11β,21-dihydroxy-17α-difluoromethyl-20-keto-2'-(4-fluorophenyl)-pregna-4,6-dieno[3,2-c]pyrazole;
9α-fluoro-11β,21-dihydroxy-16α-methyl-17α-difluoromethyl-20-keto-2'-(4-fluorophenyl)-pregna-4,6-dieno-[3,2-c]pyrazole;
9α-fluoro-11β,21-dihydroxy-16β-methyl-17α-difluoromethyl-20-keto-2'-(4-fluorophenyl)-pregna-4,6-dieno-[3,2-c]pyrazole;
6-chloro-9α-fluoro-11β,21-dihydroxy-17α-difluoromethyl-20-keto-2'-(4-fluorophenyl)-pregna-4,6-dieno-[3,2-c]pyrazole;
6-chloro-9α-fluoro-11β,21-dihydroxy-16α-methyl-17α-difluoromethyl-20-keto-2'-(4-fluorophenyl)-pregna-4,6-dieno[3,2-c]pyrazole;
6-chloro-9α-fluoro-11β,21-dihydroxy-16β-methyl-17α-difluoromethyl-20-keto-2'-(4-fluorophenyl)-pregna-4,6-dieno[3,2-c]pyrazole;
6,9α-difluoro-11β,21-dihydroxy-17α-difluoro-methyl-20-keto-2'-(4-fluorophenyl)-pregna-4,6-dieno[3,2-c]-pyrazole;
6,9α-difluoro-11β,21-dihydroxy-16α-methyl-17α-difluoromethyl-20-keto-2'-(4-fluorophenyl)-pregna-4,6-dieno-[3,2-c]pyrazole;
6,9α-difluoro-11β,21-dihydroxy-16β-methyl-17α-difluoromethyl-20-keto-2'-(4-fluorophenyl)-pregna-4,6-dieno-[3,2-c]pyrazole; and
6-methyl-9α-fluoro-11β,21-dihydroxy-17α-difluoromethyl-20-keto-2'-(4-fluorophenyl)-pregna-4,6-dieno-[3,2-c]pyrazole.

By utilizing phenylhydrazine in place of p-fluorophenylhydrazine, the 2'-phenylpregna-4,6-dieno[3,2-c]pyrazoles corresponding to the above compounds are obtained. Likewise, use of hydrazine produces the corresponding 2'-unsubstituted derivatives.

Example 8

A mixture of 1 g. of 6α,9α-difluoro-11β,21-dihydroxy-16α-methyl-17α-difluoromethyl-20-keto-2'-(4-fluorophenyl)-pregna-4-eno[3,2-c]pyrazole, 4 ml. of pyridine and 2 ml. of acetic anhydride is allowed to stand at room temperature for 15 hours. The mixture is then poured into ice water and the solid which forms is collected by filtration, washed with water and dried to yield 6α,9α-difluoro-11β-hydroxy-16α-methyl-17α-difluoromethyl-20-keto-21-acetoxy-2'-(4-fluorophenyl)-pregn-4-eno[3,2-c]-pyrazole which may be further purified through recrystallization from acetone:hexane.

Likewise, the specific 21-hydroxy derivatives prepared in the foregoing examples are converted to the corresponding 21-acetoxy derivatives via the procedure of this example. Utilization of other anhydrides in the foregoing procedure yields the corresponding 21-acylates, e.g. with propionic anhydride there is obtained the 21-propionate.

Example 9

A solution of 6 g. of 11β-hydroxy-17α-difluoromethyl-20-keto-21-tetrahydropyranyloxy-2'-(4-fluorophenyl)pregn-4-eno[3,2-c]pyrazole in 120 ml. of pyridine is added to a mixture of 6 g. of chromic trioxide in 20 ml. of pyridine. The reaction mixture is allowed to stand at room temperature for 15 hours, is diluted with ethyl acetate and filtered through Celite diatomaceous earth. The filtrate is washed well with water, dried and evaporated to dryness to yield 11,20-diketo-17α-difluoromethyl-21-tetrahydropyranyloxy-2'-(4-fluorophenyl)-pregn-4-eno[3,2-c]pyrazole, which is recrystallized from acetone:hexane.

To a solution of 1 g. of 11,20-diketo-17α-difluoromethyl-21-tetrahydropyranyloxy-2'-(4-fluorophenyl)-pregn-4-eno[3,2-c]pyrazole in 30 ml. of acetic acid is added 0.5 ml. of 2 N hydrochloric acid. The mixture is allowed to stand five hours at room temperature and then diluted with ice water and extracted with methylene chloride. The extracts are washed with water to neutrality, dried over sodium sulfate and evaporated to dryness to yield 11,20-diketo-17α-difluoromethyl-21-hydroxy-2'-(4-fluorophenyl)-pregn-4-eno[3,2-c]pyrazole which is recrystallized from acetone:hexane.

Example 10

To a cooled solution (0° C.) of 3.4 g. of 11,20-diketo-17α-difluoromethyl-21-hydroxy-2'-(4-fluorophenyl)-pregn-4-eno[3,2-c]pyrazole in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in 20 ml. of acetone treated at room temperature and under stirring with 4 g. of sodium iodide. Sodium thiosulfate solution is added to decolorize the mixture, followed by the addition of water. The solid which forms is collected by filtration and dried in vacuo to yield 11,20-diketo-17α-difluoromethyl-21-iodo-2'-(4-fluorophenyl)-pregn-4-eno[3,2-c]pyrazole. This material is dissolved in 20 ml. of acetonitrile and treated dropwise with 1.4 g. of silver fluoride in 3 ml. of water. The mixture is allowed to stand at room temperature for 24 hours and is then filtered. The filtrate is concentrated under vacuum and the solid which forms is collected and dried to yield 11,20-diketo-17α-difluoromethyl-21-fluoro-2'-(4-fluorophenyl)-pregn-4-eno[3,2-c]pyrazole which is recrystallized from methanol:acetone.

Example 11

A mixture of 1 g. of 11,20-diketo-17α-difluoromethyl-21-iodo-2'-(4-fluorophenyl)-pregn-4-eno[3,2-c]pyrazole and 1.1 molar equivalents of silver monobasic phosphate in 60 ml. of acetonitrile is heated at reflux for two hours. The mixture is then filtered and evaporated to dryness to yield 11,20-diketo-17α-difluoromethyl-21-phosphato-2'-(4-fluorophenyl)-pregn-4-eno[3,2-c]pyrazole which may be recrystallized from methanol:ethyl acetate. This product, dissolved in methanol, may be triturated with aqueous sodium hydroxide to yield the corresponding monosodium and disodium salts.

What is claimed is:
1. Compounds of the formula:

wherein $R^1$ is hydroxy, a hydrocarbon carboxylic acyloxy group of less than 12 carbon atoms, fluoro, phosphato or tetrahydropyranyloxy;
$R^2$ is hydrogen or methyl;
$R^3$ is hydrogen, chloro, fluoro or methyl;
$R^4$ is hydrogen or fluoro;
$R^5$ is β-hydroxy or keto;
$R^6$ is hydrogen, phenyl, chlorophenyl, fluorophenyl, methoxyphenyl or methylphenyl;
Y is chloro or fluoro; and
Z is a carbon-carbon double bond, a carbon-carbon single bond or the difluoromethylene group $$CF_2$$

2. Compounds according to claim 1 wherein $R^1$ is hydroxy or acetoxy; $R^3$ is hydrogen or fluoro; $R^5$ is β-hydroxy; $R^6$ is phenyl or p-fluorophenyl; Y is fluoro; Z is a carbon-carbon single bond or difluoromethylene; and $R^2$ and $R^4$ are as therein defined.

3. The compound according to claim 1 wherein $R^1$ is hydroxy; $R^2$, $R^3$ and $R^4$ are each hydrogen; $R^5$ is β-hydroxy; $R^6$ is phenyl; Y is fluoro; and Z is a carbon-carbon single bond.

4. The compound according to claim 1 wherein $R^1$ is hydroxy; $R^2$, $R^3$ and $R^4$ are each hydrogen; $R^5$ is β-hydroxy; $R^6$ is p-fluorophenyl; Y is fluoro; and Z is a carbon-carbon single bond.

5. The compound according to claim 1 wherein $R^1$ is hydroxy; $R^2$ is α-methyl; $R^3$ is α-fluoro; $R^4$ is hydrogen; $R^5$ is β-hydroxy; $R^6$ is phenyl; Y is fluoro; and Z is a carbon-carbon single bond.

6. The compound according to claim 1 wherein $R^1$ is hydroxy; $R^2$ is α-methyl; $R^3$ is α-fluoro; $R^4$ is hydrogen; $R^5$ is β-hydroxy; $R^6$ is p-fluorophenyl; Y is fluoro; and Z is a carbon-carbon single bond.

7. The compound according to claim 1 wherein $R^1$ is hydroxy; $R^2$ is α-methyl; $R^3$ is hydrogen; $R^4$ is α-fluoro; $R^5$ is β-hydroxy; $R^6$ is phenyl; Y is fluoro; and Z is a carbon-carbon single bond.

8. The compound according to claim 1 wherein $R^1$ is hydroxy; $R^2$ is α-methyl; $R^3$ is hydrogen; $R^4$ is α-fluoro; $R^5$ is β-hydroxy; $R^6$ is p-fluorophenyl; Y is fluoro; and Z is a carbon-carbon single bond.

9. The compound according to claim 1 wherein $R^1$ is hydroxy; $R^2$ is α-methyl; $R^3$ and $R^4$ are each fluoro; $R^5$ is β-hydroxy; $R^6$ is phenyl; Y is fluoro; and Z is a carbon-carbon single bond.

10. The compound according to claim 1 wherein $R^1$ is hydroxy; $R^2$ is α-methyl; $R^3$ and $R^4$ are each fluoro; $R^5$ is β-hydroxy; $R^6$ is p-fluorophenyl; Y is fluoro; and Z is a carbon-carbon single bond.

11. The compound according to claim 1 wherein $R^1$ is hydroxy; $R^2$ is α-methyl; $R^3$ is hydrogen; $R^4$ is fluoro; $R^5$ is β-hydroxy; $R^6$ is phenyl; Y is fluoro; and Z is difluoromethylene.

12. The compound according to claim 1 wherein $R^1$ is hydroxy; $R^2$ is α-methyl; $R^3$ is hydrogen; $R^4$ is fluoro; $R^5$ is β-hydroxy; $R^6$ is p-fluorophenyl; Y is fluoro; and Z is difluoromethylene.

13. The compound according to claim 1 wherein $R^1$ is hydroxy; $R^2$ and $R^3$ are each hydrogen; $R^4$ is fluoro; $R^5$ is β-hydroxy; $R^6$ is phenyl; Y is fluoro; and Z is difluoromethylene.

14. The compound according to claim 1 wherein $R^1$ is hydorxy; $R^2$ and $R^3$ are each hydrogen; $R^4$ is fluoro; $R^5$ is β-hydroxy; $R^6$ is p-fluorophenyl; Y is fluoro; and Z is difluoromethylene.

15. The compound according to claim 1 wherein $R^1$ is hydroxy; $R^2$ is α-methyl; $R^3$ and $R^4$ are each hydrogen; $R^5$ is β-hydroxy; $R^6$ is phenyl; Y is fluoro; and Z is difluoromethylene.

16. The compound according to claim 1 wherein $R^1$ is hydroxy; $R^2$ is α-methyl; $R^3$ and $R^4$ are each hydrogen; $R^5$ is β-hydroxy; $R^6$ is p-fluorophenyl; Y is fluoro; and Z is difluoromethylene.

17. The compound according to claim 1 wherein $R^1$ is hydroxy; $R^2$, $R^3$ and $R^4$ are each hydrogen; $R^5$ is β-hydroxy; $R^6$ is phenyl; Y is fluoro; and Z is difluoromethylene.

18. The compound according to claim 1 wherein $R^1$ is hydroxy; $R^2$, $R^3$ and $R^4$ are each hydrogen; $R^5$ is β-hydroxy; $R^6$ is p-fluorophenyl; Y is fluoro; and Z is difluoromethylene.

References Cited
UNITED STATES PATENTS
3,213,084   10/1965   Schaub et al. _____ 260—239.5

ELBERT L. ROBERTS, *Primary Examiner.*